United States Patent
Sidiropoulos et al.

[11] Patent Number: 6,127,669
[45] Date of Patent: Oct. 3, 2000

[54] COMPUTER-AIDED DETERMINATION OF WINDOW AND LEVEL SETTINGS FOR FILMLESS RADIOLOGY

[75] Inventors: Nikolaos D. Sidiropoulos, Charlottesville, Va.; John S. Baras, Potomac, Md.

[73] Assignee: University of Maryland, College Park, Md.

[21] Appl. No.: 09/015,331

[22] Filed: Jan. 29, 1998

Related U.S. Application Data

[60] Provisional application No. 60/036,335, Jan. 29, 1997.

[51] Int. Cl.⁷ .............................. G06K 9/00; G06K 9/34
[52] U.S. Cl. ..................................... 250/208.1; 382/171
[58] Field of Search .................... 250/208.1, 587; 600/300, 425; 382/131, 132, 168, 169, 171, 173, 254, 260; 345/131, 133, 140; 395/101, 102

[56] References Cited

U.S. PATENT DOCUMENTS

| | | |
|---|---|---|
| 4,975,970 | 12/1990 | Zettel et al. .......................... 382/169 |
| 5,305,204 | 4/1994 | Ohhashi . |
| 5,447,153 | 9/1995 | Weil et al. . |
| 5,542,003 | 7/1996 | Wofford . |
| 5,563,720 | 10/1996 | Edgar et al. . |

*Primary Examiner*—Seungsook Ham
*Assistant Examiner*—Kevin Pyo
*Attorney, Agent, or Firm*—Dickstein Shapiro Morin & Oshinsky LLP

[57] ABSTRACT

A window and level control tool that operates in real time and can quickly determine initial values for window and level settings such that a displayed image is always presented in a readable format is disclosed. The invention transforms input image data into an image histogram. This histogram is then segmented into a small number of parts corresponding to structures of interest. Segmentation of the histogram is done by a novel Viterbi optimal runlength-constrained approximation nonlinear filter. Window and level settings are calculated to correspond to this optimal segmentation. A readable image of one of the structures of interest is then displayed. In another embodiment, the tool provides a menu of optimal window and level settings corresponding to the different types of information a radiologist may be interested in.

21 Claims, 12 Drawing Sheets

COMPUTER-AIDED DETERMINATION OF WINDOW AND LEVEL SETTINGS FOR FILMLESS RADIOLOGY

U.S. Provisional Application No. 60/036,335, filed on Jan. 29, 1997, having the same named inventors as the instant application is incorporated herein by reference in its entirety.

BACKGROUND OF THE INVENTION

The invention relates to the field of digital radiology image systems, and in particular to a real time method and apparatus for determining the appropriate window and level settings used while displaying the digital images.

One of the handicaps of current digital radiology systems is that display technology does not measure up to the dynamic range capabilities of radiographic acquisition systems. As a result, currently available display terminals can only deliver part of the dynamic range present in Picture Archiving and Communications System (PACS) images commonly used in the medical field. Images such as X-rays can be acquired, stored and fed to a radiographic workstation at 12 or 14 bits per pixel. (Pixels values range from 0 to 4095 (4096 values) for 12-bit pixels.) Display equipment, however, typically supports only 8 bits per pixel. (Pixel values range from 0 to 255 (256 values) for 8-bit pixels.) Therefore, acquired images represented by pixels capable of having 4096 different values are displayed on monitors that can only display pixels with 256 values. This loss in dynamic range requires enhancement of the displayed image by the workstation operator (e.g., the radiologist).

Some images, for example, computed tomography (CT) images, do not undergo such a drastic loss in dynamic range. Nevertheless, these images still require the enhancement of particular (task-specific) segments of the dynamic range to bring (task-dependent) features of interest in focus. Since most images will be multimodal (that is, they contain more than one structure of potential interest, for example, bone or tissue) there exists a need to look at specific structures within the image. Again, this enhancement would be performed by the radiologist.

In practice, the radiologist enhances the displayed image by controlling the effective dynamic range of the image. This enhancement is done by setting two display parameters known as the "window" and "level" settings. The radiologist looks at the dynamic range of the image through a window of a specified width which is centered at level (see FIG. 2).

The system shown in U.S. Pat. No. 5,447,153 is typical of an apparatus that requires the operator to manually select window and level settings before any enhancement is made to the image. An interpretation session is used by the radiologist to view images of the patient and to determine the extent of the patient's ailment. In a typical interpretation session, the radiologist will first attempt to find a reasonably good approximation for the window and level settings to bring the study into focus (that is, to make all of the structures of interest visible). This initial step takes valuable time and effort even for experienced radiologists. An experienced radiologist may spend 20 to 40 percent of the interpretation session just to get the image in focus. Inexperienced radiologists may never obtain suitable window and level settings, resulting in an unreadable image, which may lead to an improper diagnosis. Difficulty in obtaining the correct window and level settings are attributable, in part, to the fact that the displayed image initially comes up in an almost unreadable format.

Prior attempts have been made to automate this procedure. For example, U.S. Pat. No. 5,542,003 refers to a method for maximizing the dynamic range for a region of interest within a medical image. The disclosed method utilizes a simplistic algorithm that operates on an image histogram of the region of interest selected by the operator, but sets window and level parameters based on minimum and maximum pixel values within the region of interest (ROI). In addition, the algorithm rejects a predetermined percentage of pixel values at the endpoints of the histogram.

U.S. Pat. No. 5,305,204 refers to an apparatus with automatic window and level adjustment. The disclosed apparatus utilizes an algorithm that operates on an image histogram of the region of interest selected by the operator, but sets window and level parameters by compensating for a dark background, calculating initial settings, assessing image quality, and modifying the settings. The procedure is repeated until a proper window and level setting is acquired.

These prior attempts to automate the window and level adjustments, however, can not furnish multiple window and level settings required to properly visualize and interpret multimodal images. As such, these prior art attempts can not provide a menu of optimal window and level settings corresponding to the different types of information the radiologist may be interested in (for example, blood vessels, lung nodules, soft tissue, microcalcifications, etc.). In addition, these prior art attempts do not always display an initial image that is presented in a readable format. Without these features, the interpretation of the patient's image will be difficult and may lead to an improper diagnosis.

A window and level control tool that operates in real time and can quickly determine initial values for window and level settings such that the displayed image is always presented in a readable format is desired to solve the aforementioned problems. It is desirable that any such tool provide a menu of optimal window and level settings corresponding to the different types of information the radiologist may be interested in (for example, blood vessels, lung nodules, soft tissue, microcalcifications, etc.). The number of menus should be limited to optimal settings, not an endless list of "equally good" alternatives. It is desirable that any such tool relies on image statistics in addition to suspected pathology. It is desirable that any such tool be "generic" in that it does not need to be tied to any particular medical imaging modality, or the type of study being conducted. In addition, it is desirable that any such tool be customizable to fit the needs of individual radiologists. Prior art systems or tools have not been able to accommodate these needs.

SUMMARY OF THE INVENTION

An object of this invention is to provide a tool that quickly determines initial values for window and level settings such that the displayed image is always presented in a readable format.

Another object of this invention is to automatically determine window and level pre-settings in real time.

Another object of this invention is to provide a menu of window and level settings corresponding to different types of information of interest.

A further object of this invention is to provide a window and level control tool that is customizable to fit the needs of individuals.

The invention accomplishes the above and other objects and advantages by providing a method and apparatus for transforming input image data into an image histogram. The image histogram represents pixel values by the number of pixels in the image with that value. This histogram is then segmented into a small number of parts corresponding to structures of interest. Segmentation of the histogram is preferably done by a novel Viterbi optimal runlength-constrained approximation nonlinear filter. Window and level settings are then automatically calculated to correspond to this optimal segmentation. A readable image of one of the structures of interest can then be displayed.

The invention may be operated in real time. A menu of window and level settings may be displayed to allow the radiologist to browse through all structures of potential interest. A menu of optimal window and level settings may also be provided. This menu allows the radiologist to browse optimal structures of interest. The invention may also be customizable to fit the needs of individual radiologists.

BRIEF DESCRIPTION OF THE DRAWINGS

The foregoing and other objects and advantages of the invention will become more apparent from the detailed description of the preferred embodiments of the invention given below with reference to the accompanying drawings in which.

DESCRIPTION OF THE PREFERRED EMBODIMENTS

The invention will be described in detail as set forth in the preferred embodiments illustrated in FIGS. 1–12. Although these embodiments depict the invention as in its preferred application to a digital radiology image system, it should be readily apparent that the invention has equal application to any type of image system that encounters the same or similar problems.

Figure 1:
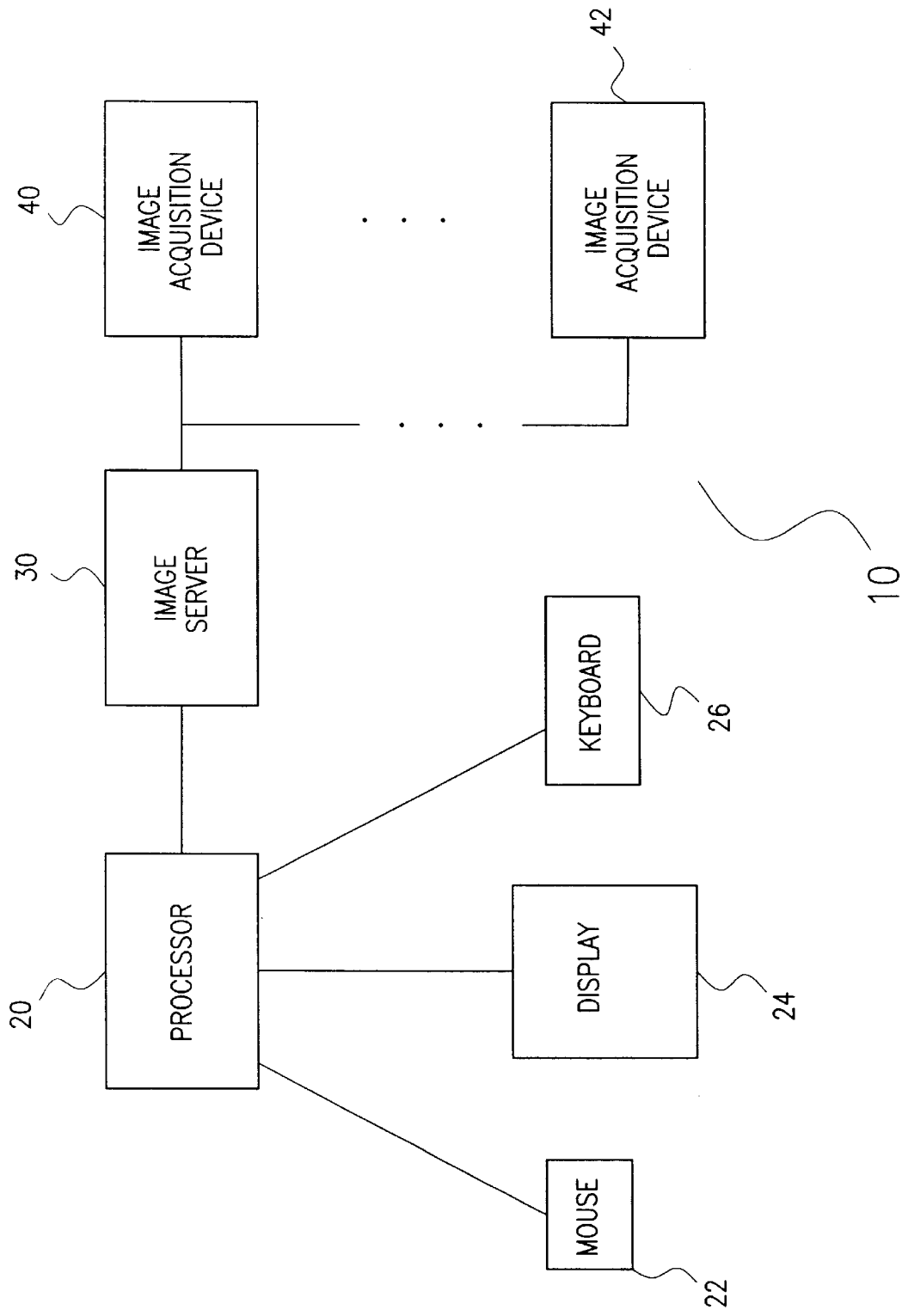
FIG. 1 is a block diagram of a digital radiology image system in accordance with a preferred embodiment of the invention.
Figure 2:
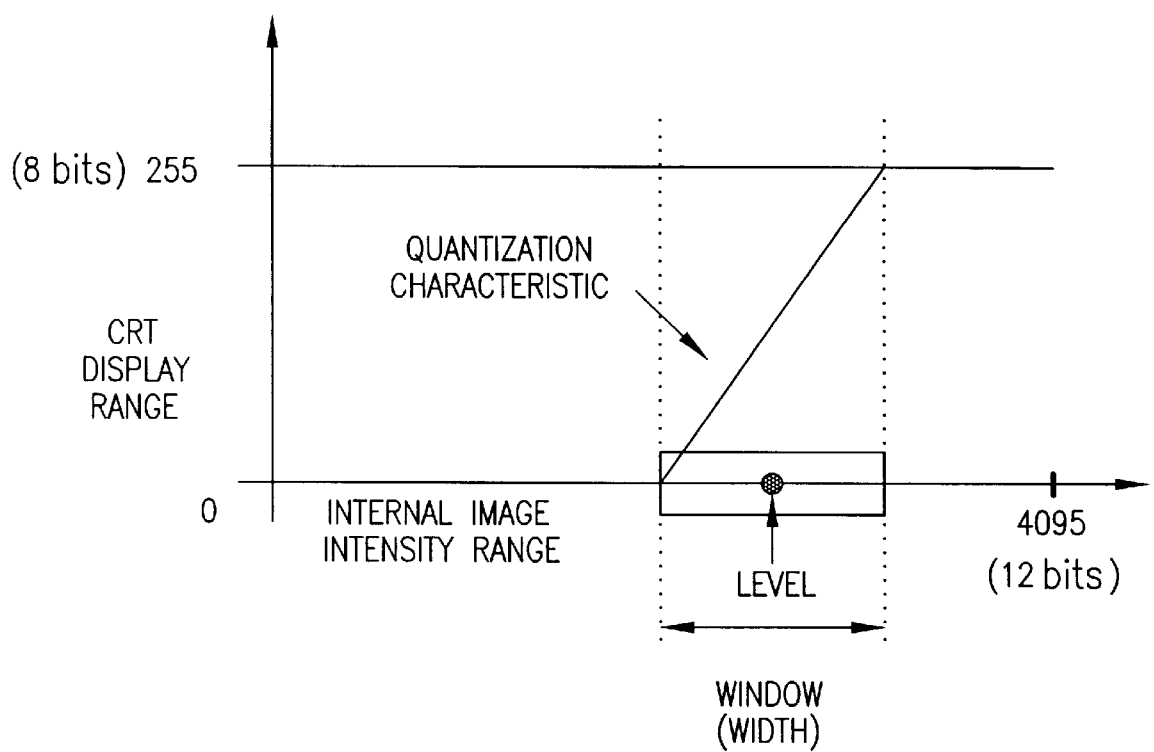
FIG. 2 is an illustration of the operation of window and level settings to control the dynamic range of an image displayed on a CRT.

FIG. 1 shows a digital radiology image system 10 in accordance with a preferred embodiment of the invention. The system 10 includes a processor 20, a mouse 22, a display 24, a keyboard 26, an image server 30, and medical image acquisition devices 40, 42 (e.g., scanners, etc.). The processor 20 is connected to the image server 30. The image server 30 is connected to image acquisition devices for various medical imaging modalities 40, 42. These elements may be connected directly by wired or wireless link, or via a network or any other communication device. These components may all be located at the same site, or in various remote locations without departing from the invention. One or more (even all) of the components may be combined into a single module. For example, any number of image scanners, or any instrumentality that combines an image scanner with an image server, may be employed in practicing the invention.

The mouse 22, the display 24, and the keyboard 26 are connected to the processor 20. It is understood by those skilled in the art that the processor 20 can be connected to other peripherals, such as printers or CD ROMs, and that the processor 20 contains memory sufficient to store data and run computer programs or could be used in conjunction with other memory devices to perform its function. A detailed description of the structure and operation of these devices is not believed necessary herein, as the devices are all separately well-known devices to those of ordinary skill in the art.

The medical image acquisition devices 40, 42 may all or individually be X-ray machines, computed tomography (CT) scanners, or any other imaging device known in the art. The medical image acquisition devices 40, 42 are responsible for scanning an area of a patient's body (or some other subject of interest), referred to as the "image," and transforming this image into digital image data. The medical image acquisition devices 40, 42 provide scanned image data to the image server 30. The image server 30 provides image data to the processor 20. The image data is generally acquired, stored, and fed to the processor 20 at 12 or 14 bits per pixel. (Pixels values range from 0 to 4095 (4096 values) for 12-bit pixels.) The display 24 typically supports 8 bits per pixel as in conventional displays. (Pixel values range from 0 to 255 (256 values) for 8-bit pixels.) Therefore, there is a 16:1 loss in dynamic range when the scanned image is displayed (that is, each display pixel will represent 16 different scanned image pixels). Image enhancement is required to compensate for this loss in dynamic range.

Some images, for example CT images, do not undergo such a drastic loss in dynamic range. Nevertheless, since these images may be multimodal (that is, they contain more than one structure of potential interest, for example, bone or tissue), the images still require the enhancement of particular (task-specific) segments of the dynamic range to bring (task-dependent) features of interest in focus.

In accordance with one preferred embodiment of the invention, the image enhancement is automatically performed by a window and level tool operating within the processor 20, as will be described below.

Informally, a window and level tool, in accordance with the invention, may be thought of as a process which takes an image as its input, and produces a short menu of clinically relevant candidate settings as its output. For example, when a doctor examines a foot X-ray the doctor would like the computer to suggest a window and level setting for viewing mainly bone content with as much detail and texture as possible, and with little soft tissue information. The doctor may then make another window and level selection for viewing mainly soft tissue information, and then maybe yet another such choice which will allow the doctor to assess the extent of "film" damage.

The problem can be formally defined as a mapping w: $I \rightarrow \{(w_i, l_i)\}_{i=1}^P$, from the set of all images I to a collection of p candidate settings, where p is a small integer. Complexity considerations require this mapping to be computable within the time-work constraints set forth above. As an important first step in this direction, we restrict this mapping to operate on the image histogram, instead of the image per se. The underlying rationale for this decision is based on the fact that the window and level operation is a pixel-wise, or first-order operation. Perceptual image quality correlates with first-order measures, as evidenced by the early success of simple histogram equalizers in improving contrast and perceived quality in still images. We therefore consider w: $H \rightarrow \{(w_i, l_i)\}_{i=1}^P$, where H is the set of all image histograms.

Most medical imaging modalities produce images of the spatial distribution of some indirectly measurable property of a projection or slice of the human body, for example, the tissue density in an X-ray image. The very basis of X-ray imaging is that different anatomical structures, like bone and soft tissue, have very different densities, and therefore, very different X-ray absorption patterns. This results in radically different intensity profiles for bone and soft tissue image regions. This difference also manifests itself in the histogram of the acquired X-ray, in which bone content and soft tissue content appear as distinct non-overlapping lobes. Noise, however, as well as measurement errors and inconsistencies often make these lobes hard to distinguish and classify. As a result, the average medical image histogram is a multimodal profile, cluttered by background outliers (that is, noise impulses which are locally inconsistent with the rest of the data), noisy local extrema, and even on-film transcription and book-keeping artifacts like patient name, date, device calibration, and file information.

Suppose we have prior knowledge of what the doctor will be looking for in a particular exam. An approach would be to attempt to localize the histogram lobe corresponding to the particular anatomical structure the doctor is interested in, then pick the window and level controls to zoom in on this structure.

This approach has many pitfalls. For starters, the doctor is typically interested in a number of structures, instead of a single structure, that is, an aggregate multimodal lobe, instead of a single, well-defined lobe. Furthermore, due to variability in the image acquisition process, these histogram features may undergo shifts (owing to variability in dosage), and/or nonlinear distortion (owing to non-uniform illumination). These factors, along with noise, outliers, and other artifacts, make it extremely difficult to track specific features in the histogram (pick the level setting). In addition, it is difficult to decide how to choose the window width. Accordingly, a better technique is required to enhance these images.

To provide such a technique, the invention follows the preferred approach, which is to segment the given image histogram into a relatively small number of parts corresponding to structures of potential interest, then allow the doctor to browse these hypothesized structures by zooming in on them according to some schedule. Segmentation of the image histogram will be discussed below. The zooming is achieved by placing a window (with a width equal to the chosen segment length) at level (which is equal to the centroid of the chosen segment). The scheduling, as well as the number of segments can be adapted to individual preferences.

The segmentation should be based on a lobe clustering approach. That is, it should attempt to cluster together histogram features which are "close," both in terms of pixel value (grey value), and in terms of count (spatial distribution). The window and level operation allows a doctor to view convex segments of the dynamic range, and this implies that the segments of the resulting partition should be convex. In addition, the length of these segments should be bounded by some predetermined constant. This is needed to assure that (a) we do not oversegment the histogram (presenting the doctor with too many menu choices), and (b) the resulting window suggestions are not too narrow (narrow windows correspond to very coarse quantization using few grey levels, and this results in blocky, visually inferior image renditions, which do not fare well with radiologists). Based on these observations, we may now proceed to pose this histogram segmentation as a formal optimization problem.

Let $y(n) \in A$, $n=0, 1, \ldots N-1$, denote the histogram of the input image (or portion thereof). Here, $A=\{0, 1, \ldots, |A|-1\}$, and $|A|$ is a (possibly large) finite integer, which depends on the image itself. Let $P_M^N$ denote the set of all sequences of N elements of A which are piecewise constant of run length>M. Consider the following constrained optimization:

minimize $E_{n=0}^{N-1} d_n(y(n), x(n))$ subject to: $x=\{x(n)\}_{n=0}^{N-1} \in P_M^N$ Here, $d_n(.,.)$ is any point-wise distortion measure which quantifies faithfulness to the data. For obvious reasons, M will be referred to as the constraint length. This optimization has been posed and solved in a recent paper, N. D. Sidiropoulos, "The Viterbi Optimal Runlength-Constrained Approximation Nonlinear Filter", IEEE Trans. Signal Processing, Vol. 44 No. 3, March 1996, which is incorporated herein by reference in its entirety. The solution is provided by a novel type of nonlinear filter called "VORCA," which admits an efficient Viterbi-type $O((|A|^2 \div |A|(M-1)) \times N)$ sequential implementation.

VORCA operates as follows. Given any sequence $x=\{x(n)\}_{n=0}^{N-1}$, $x(n) \in A$, $n=0, 1, \ldots, N-1$, define its associated state sequence, $s_x=\{[x(n), 1_x(n)]^T\}_{n=-1}^{N-1}$, where $[x(-1), 1_x(-1)]^T=[\Phi, M]^T$, $\Phi \notin A$ and $1_x(n+1)=\min\{1_x(n)+1, M\}$, $x(n+1)=x(n)$, when $n=-1, \ldots, n-2$, $1_x(n+1)=1$ for all other conditions. $[x(n), 1_x(n)]^T$ is the state at time n, and it assumes values in $A \times \{1, \ldots, M\}$. The optimal admissible path to any given state at time n+1 must be an admissible one-step continuation of an optimal admissible path to some state at time n. This leads to an efficient Viterbi-type algorithmic implementation of the optimal filter. The costs associated with one-step state transitions are specified in a way that forces one-step optimality and admissibility. Let $c(s_x(n) \rightarrow s_x(n+1))$ denote the cost of a one-step state transition. Then $c([x(n), 1_x(n)]^T \rightarrow [x(n+1), 1_x(n+1)]^T) = \infty$ when $[((1_x(n)<M)$ OR $(n \geq N-M))$ AND $((x(n+1) x(n))$ OR $(1_x(n+1)$ min $(1_x(n)+1, M\}))]$ OR $[(1_x(n)=M)$ AND $(x(n+1)=x(n))$ AND $(1_x(n+1) M)]$ OR $[(1_x(n)=M)$ AND $(x(n+1) x(n))$ AND $(1_x(n+1) 1)]$. $c([x(n), 1_x(n)]^T \rightarrow [x(n+1), 1_x(n+1)]^T) = d_{n+1}(y(n+1), x(n+1))$ for all other conditions.

Other types of local syntactic constraints can easily fit in this paradigm. For example, suppose we are interested in a piecewise linear solution of constraint length M (that is, a piecewise linear optimal approximation of segment length>M). We may therefore further augment the state to include the discrete slope of the "current" segment, that is, set $s_x(n)=[x(n), 1_x(n), t_x(n)]^T$, where $t_x(n)$ is the discrete slope state variable. (The specification of corresponding one-step state transition costs in a way that enforces one-step optimality and admissibility is straightforward to one of ordinary skill in the art, and is therefore omitted herein.)

One may handle the most general type of local syntactic constraints, by augmenting the state to include M−1 "past" values. However, this corresponds to an exponential (in M) expansion of the Viterbi trellis state space, which quickly exhausts computational resources for moderate values of M. Most problems of practical interest do not require a full state expansion, thus being amenable to efficient Viterbi-type algorithmic solutions.

Figure 3:
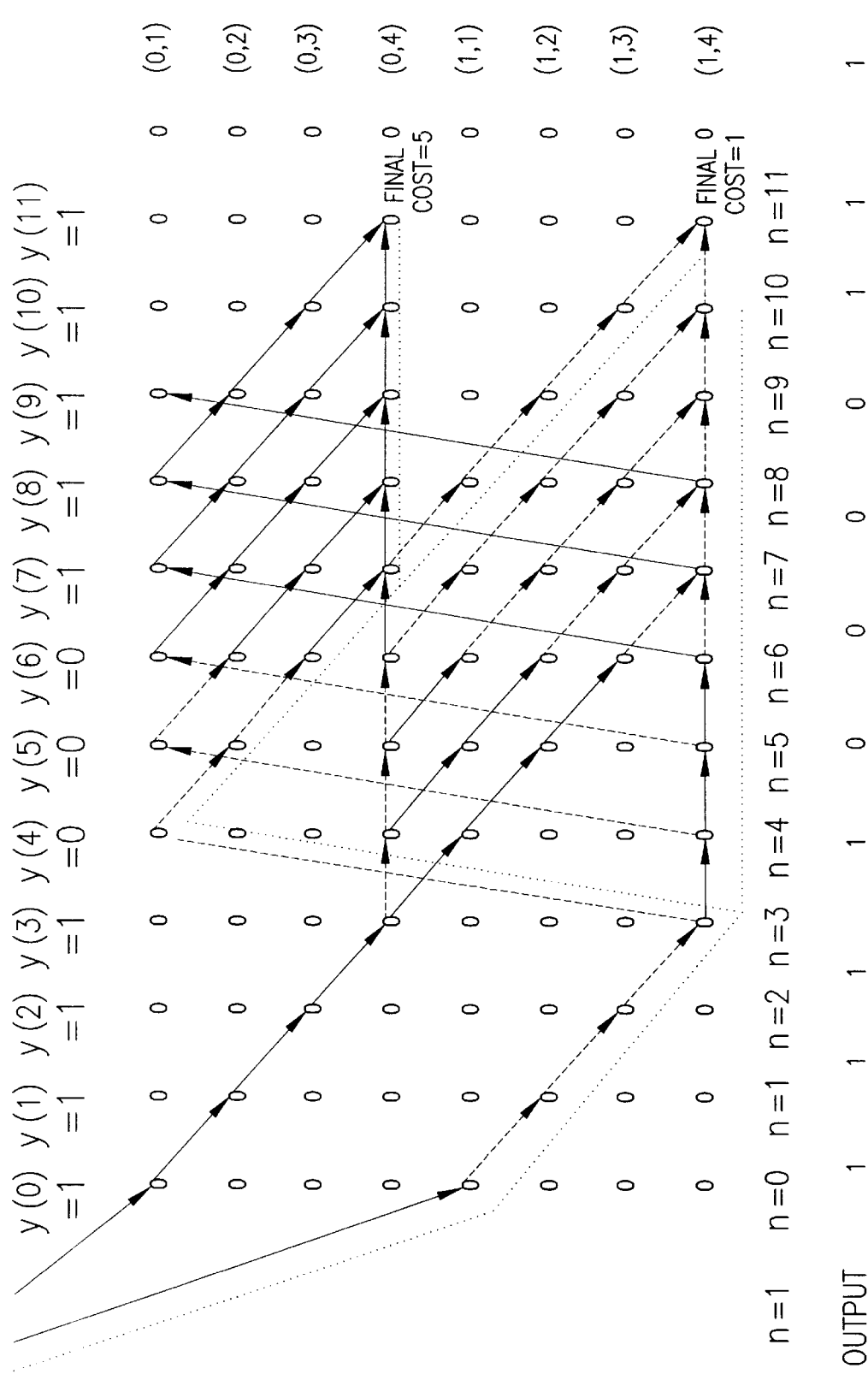
FIG. 3 is an illustration of a Viterbi Optimal Runlength-Constrained Approximation (VORCA) trellis.

A simple example is presented in FIG. 3, which depicts the VORCA trellis for the case $d_n(y(n), x(n))=|y(n)-x(n)|$, $\forall n \in \{0, 1, \ldots, N-1\}$, $N=12$, $M=4$, $A=\{0, 1\}$, and input $\{y(n)\}=\{1,1,1,1,0,0,0,1,1,1,1,1\}$. The state space consists of 8 possible states in $\{0,1\} \times \{1,2,3,4\}$. Solid lines represent transitions which involve unit costs, whereas dashed lines represent transactions which involve zero cost. Absence of a line indicates infinite transition cost. When two paths merge, the one with the higher cumulative cost can be safely eliminated. When ambiguity exists, surviving paths are highlighted using an additional dotted line parallel to the path. The optimal path is clearly the one indicated by the dotted line which leads to state (1, 4) at time n=11. We can read out the output (optimal approximation) by traversing this latter path backwards, and registering the corresponding forward state transitions. The output then is $\{x(n)\}=\{1,1,1, 1,0,0,0,0,1,1,1,1\}$.

VORCA is a nonlinear filter which has several properties that prior art nonlinear filters do not. Prior art nonlinear filters are not optimal and they are not idempotent (that is, if and when the filter converges, it will only do so after numerous passes through the filter). VORCA is both optimal and idempotent (that is, it converges in one pass through the filter). In addition, VORCA is a self-dual filter.

The proof that VORCA is idempotent is as follows. If $d_n(.,.)$ is a distance metric between elements of A $\forall n \in \{0, 1, \ldots, N-1\}$, then VORCA is idempotent. The output of a single application of VORCA is obviously in $P_M^N$. Suppose $y \in P_M^N$. Clearly, $\Sigma_{n=0}^{N-1} d_n(y(n), x(n)) \geq 0$, $\forall x \in P_M^N$. By virtue of the fact that $d_n(.,.)$ is a distance metric $\forall n \in \{0, 1, \ldots, N-1\}$, the only element, x, of $P_M^N$ which makes $\Sigma d_n(y(n), x(n))$ zero is y itself. In fact, we can guarantee idempotence under the relaxed condition that $\forall n \in \{0, 1, \ldots, N-1\}$, $d_n(.,.)$ achieves its minimum value if and only if its arguments are equal.

The proof that VORCA is self-dual is as follows. In the following, let us assume, for the sake of simplicity, that A can be identified with $\{0, 1, \ldots, L\}$, and let us define the complement, $y^c$, of an element, $y \in A$, as $y^c = L - y$, and the complement, $y^c$, of a sequence, y, in the obvious way, that is, as the pointwise complement of its elements with respect to L. If $d_n(y,x)=d_n(y^c,x^c)$, $n=0,1, \ldots, N-1$, $\forall y, x \in A$, and the constraint is self-dual (in the sense that x satisfies the constraint if and only if $x^c$ does so), then VORCA is self-dual filter, provided that the first condition holds. This is shown by:

$x'=\arg\min \Sigma_{n=0}^{N-1} d_n(y(n),x(n))=\arg\min \Sigma_{n=0}^{N-1} d_n(y^c n), x(n^c))=\arg\min \Sigma_{n=0}^{N-1} d_n(y^c n),x(n^c)) \leftrightarrow (x')^c=\arg\min \Sigma_{n=0}^{N-1} d_n(y^c n),x(n))$ where $x^c \in P_M^N$ and $x \in P_M^N$.

The VORCA has computational complexity which is linear in the number of observations, i.e., N. The proportionality constant is $|A|$ times $M_{.s}^2$. The worst-case storage requirements are $O(N_S \times N)$, and $O(|A|M \times N)$ for the VORCA, but actual storage requirements are much more modest, due to path merging. Current Viterbi technology can handle $2^{12}$ states. The availability of VLSI Viterbi decoder chips as well as several dedicated multiprocessor architectures for Viterbi-type decoding, makes the VORCA a realistic alternative to standard nonlinear filtering.

In a nutshell, the main operation of VORCA is as follows. By cleverly recasting the problem into constraint state space, which essentially amounts to keeping track of the length of the latest segment in all incomplete potential solutions, we can take advantage of a very general principle of optimization, known in the art as the "principle of optimality of dynamic programming." What this means is that in computing the optimal incomplete solution up to time (index) n, we only need to know the best incomplete solutions up to time n−1. This eliminates a great many candidate solutions, thereby enabling efficient implementation. The resulting computational structure is illustrated in FIG. 4.

Figure 4:
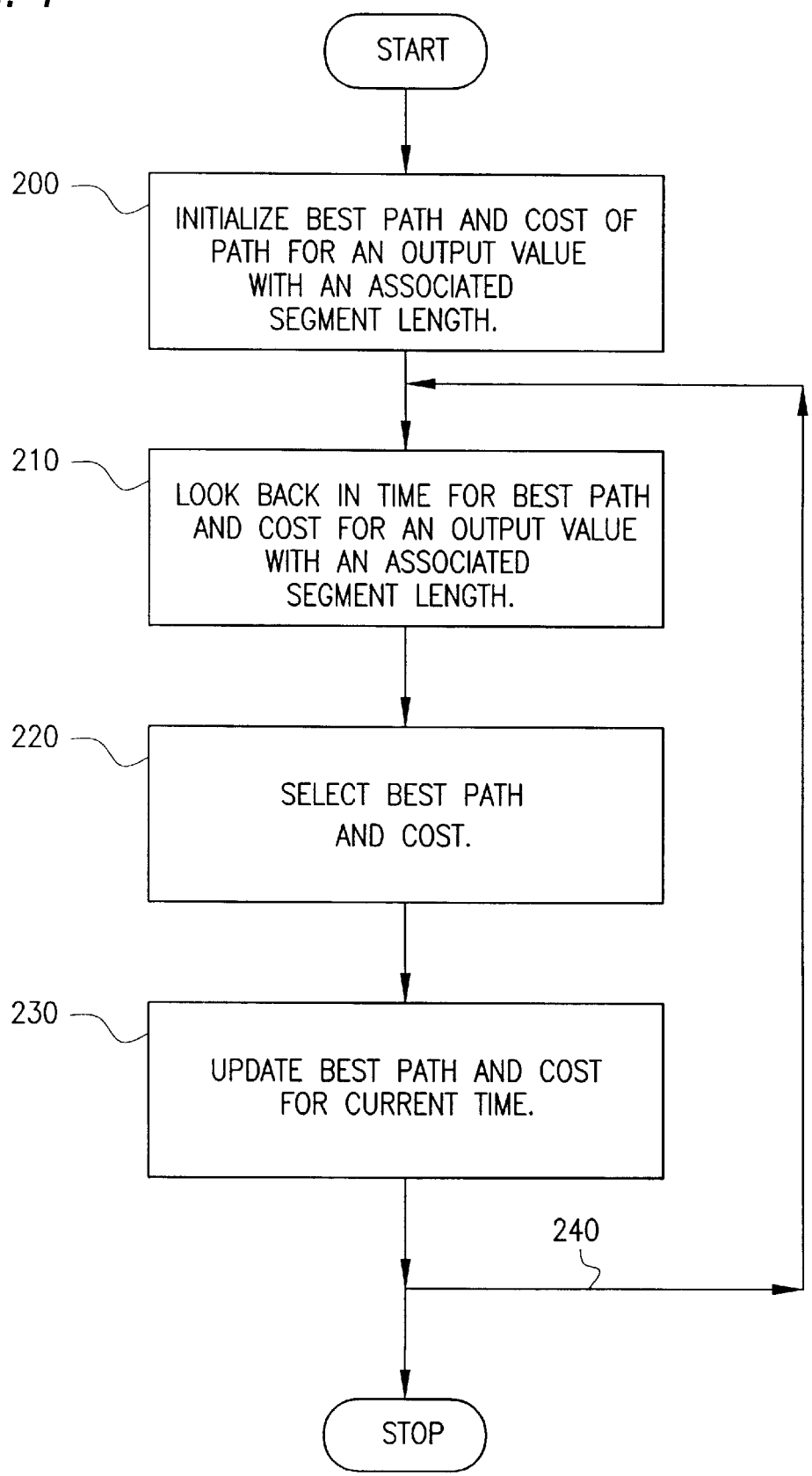
FIG. 4 is a flowchart of the operation of the VORCA nonlinear filter.

Referring now to FIG. 4, the first step 200 is to initialize a best path and its associated cost leading to a particular value, x(n−1), at time n−1, and ending with a segment of 1(n−1) equal symbols, up to and including x(n−1). Here, x(n−1) takes values in $0, 1, \ldots, |A|-1$, and 1(n−1) takes values in $1, \ldots, M$ and everything above M is considered equivalent to M.

The next step 210 is to look back at all possible combinations (x(n−1), 1(n−1)) which can lead to (x(n), 1(n)) at time n. These are the combinations which satisfy either: x(n−1)=x(n) and 1(n)=min{1(n−1)+1, M}, or: 1(n−1)=M and 1(n)=1 and x(n−1) not equal to x(n).

The next step 220 is to pick the best, in the sense of selecting the one associated with the path having the smallest cost up to time n−1. Proceeding to the next step 230, the best path is extended to include (x(n),1(n)), and its cost is updated by adding d(x(n),y(n)).

Steps 210 through 230 are repeated (FIG. 4 step 240) for all times, n=0 up to N−1.

More details, along with a fairly complete theoretical characterization of the resulting nonlinear input/output operator can be found in the article by Sidiropoulos. An actual C-code implementation can be found in the attached appendix, which is incorporated herein by reference in its entirety.

The resulting optimal solution is a piecewise-constant optimal approximation of the input histogram, such that each constant piece has length>M. This optimal approximation provides a segmentation of the input histogram. This is best understood by means of an example operation of the invention.

Figure 5:
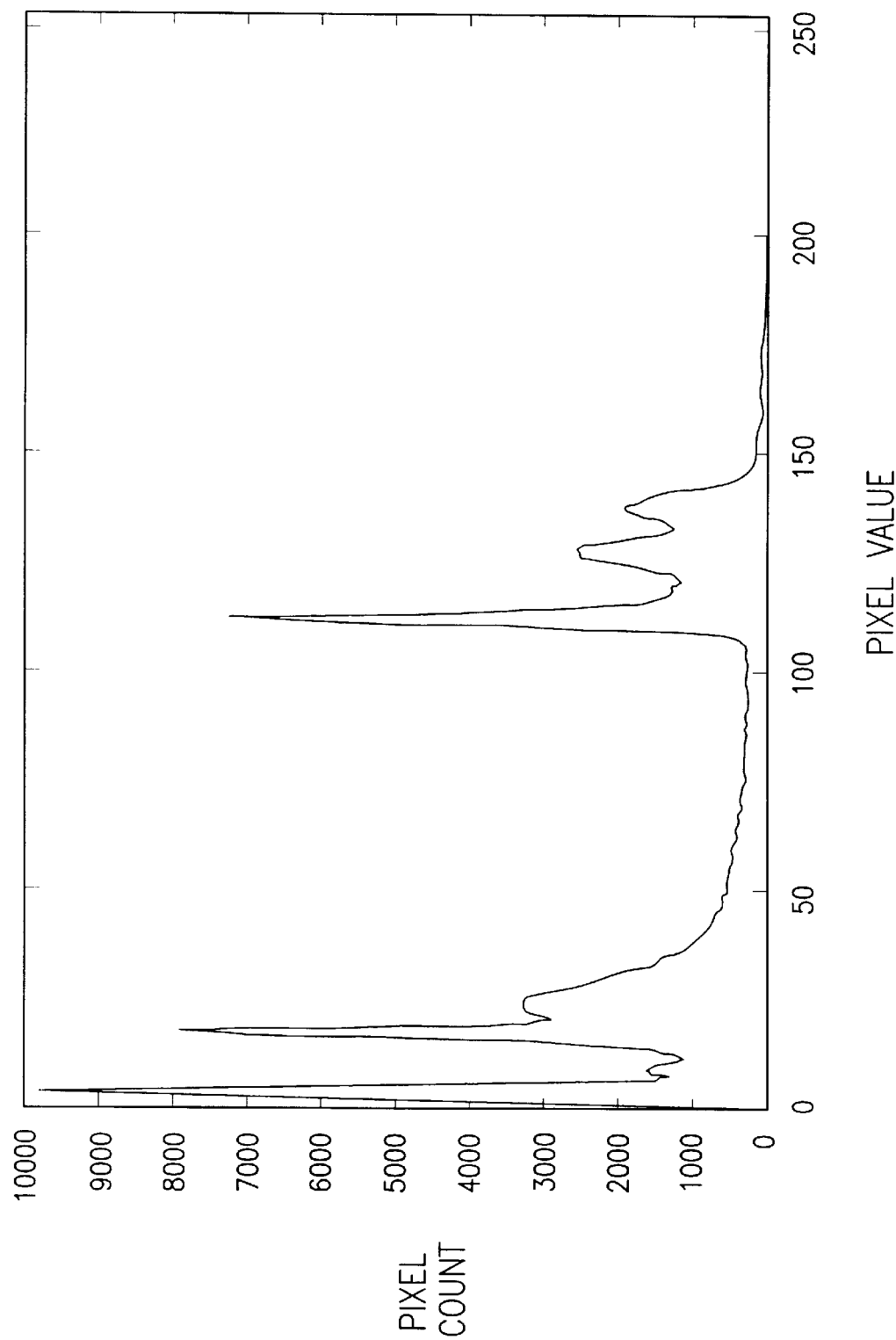
FIG. 5 is an illustration of an image histogram in accordance with the invention in which the x-axis represents pixel value and the y-axis represents pixel count.
Figure 12:
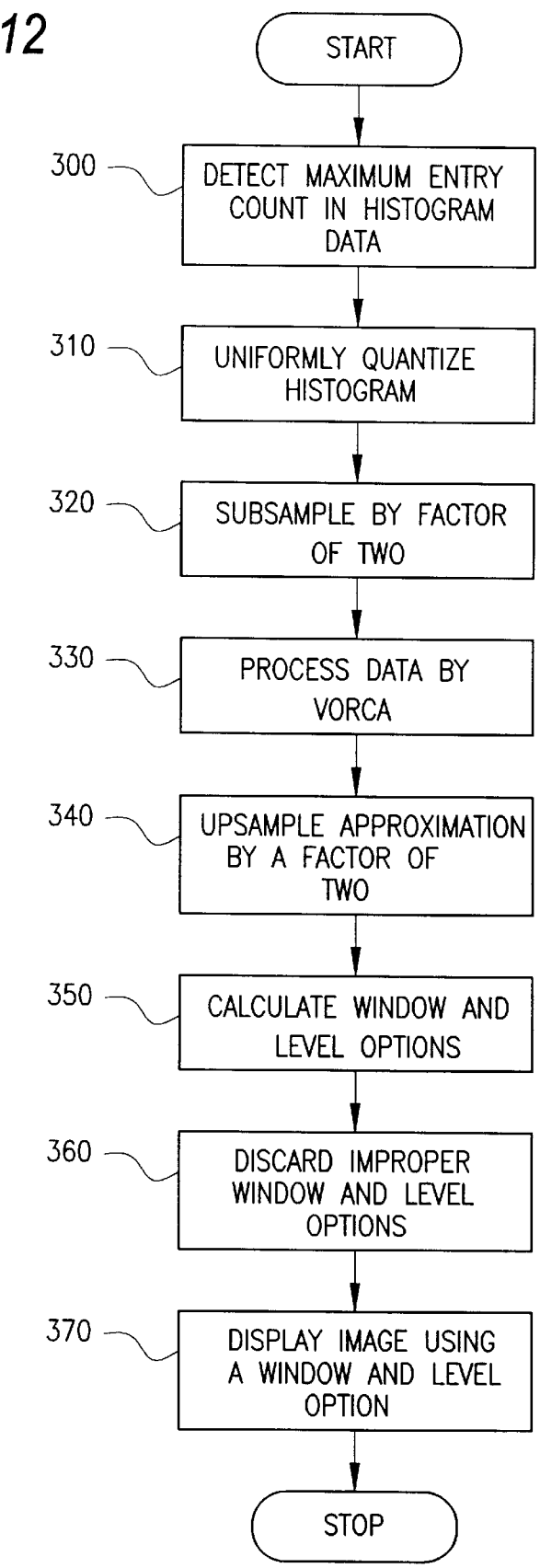
FIG. 12 is a flowchart of the operation of one embodiment of the invention.

FIG. 5 depicts the histogram profile of a scanned in digital image, where the x-axis represents pixel value and the y-axis represents pixel count. As mentioned above, the complexity of the optimization process is linear in N, but quadratic in $|A|$, and $|A|$ depends on the image itself. As a second step towards reducing complexity, we proceed to adaptively quantize the histogram profile in FIG. 5. First we detect the maximum entry (count) in the histogram table (FIG. 12, step 300). In doing this, we ignore the histogram entries corresponding to very small grey (pixel) values, since these are simply manifestations of clinically irrelevant dark background. Another reason for ignoring these small grey values is to counteract the CRT display's nonlinearity, which tends to amplify these outliers.

$|A|$ is set to this maximum. We then proceed to uniformly quantize the histogram using just 10 levels: $0, 1, \ldots, 9$ (FIG. 12, step 310). The detected maximum level, $|A|$ is mapped to 9, 0 is mapped to 0, and all other entries are mapped according to v→int $$\left(\frac{vx9}{|A|}\right),$$

(where int (.) stands for integer part), followed by a hard limiter which is needed to map the outliers to 9. This particular choice of reproduction alphabet (range) has been reached after extensive experimentation because it appears to achieve the best speed to accuracy tradeoff.

Figure 6:
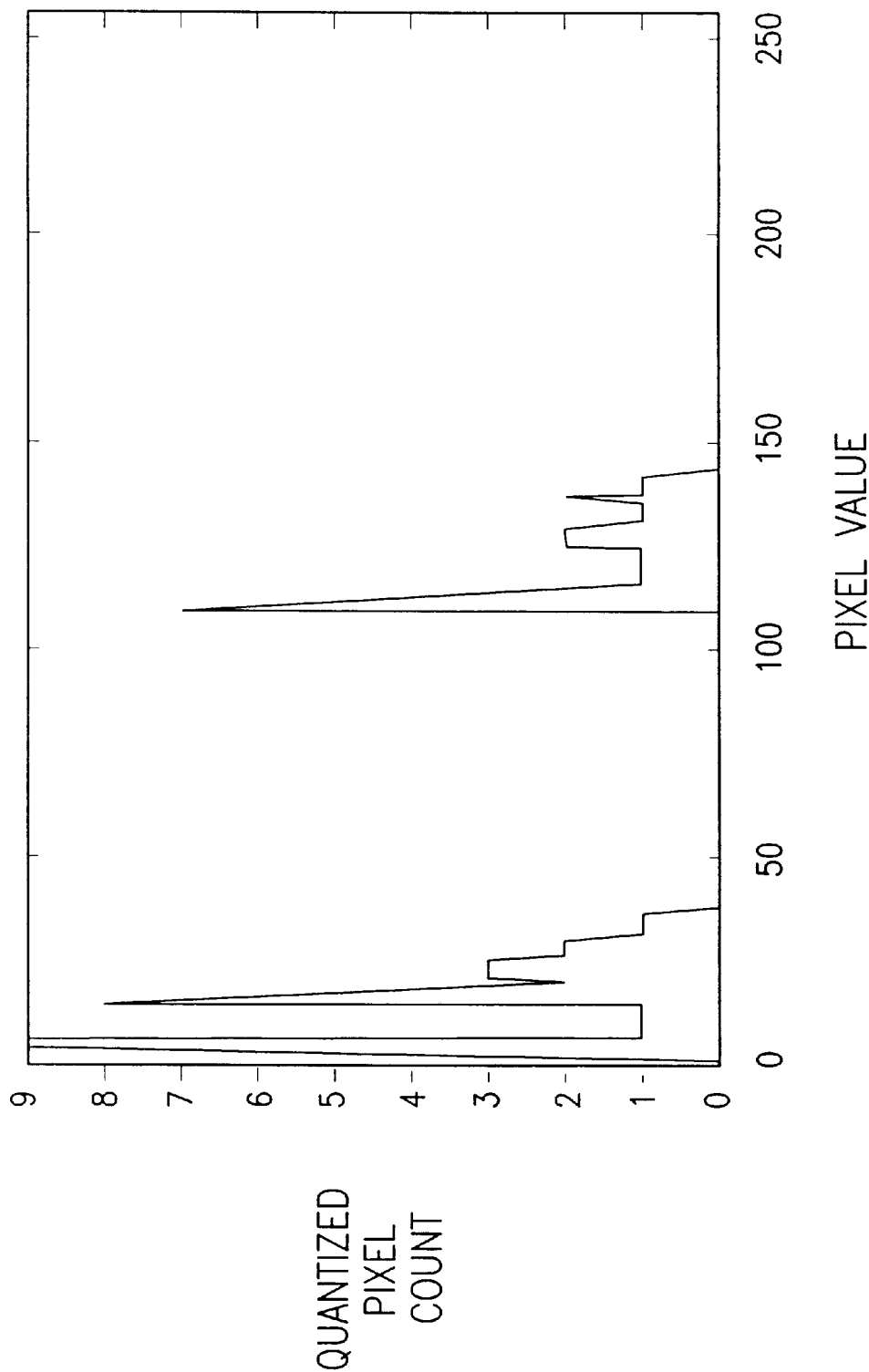
FIG. 6 is a coarsely quantized histogram of the image histogram of FIG. 5 in accordance with the invention.

The result of this adaptive quantization process is a coarse approximation of the original histogram which preserves essential histogram features while significantly reducing dynamic range, thereby eliminating a lot of the irrelevant variability. This is depicted in FIG. 6. This reduced-complexity representation is then subsampled by a factor of 2 (FIG. 12, step 320) to further reduce computation, and then processed by VORCA, using M=8, N=128, and $d_n(y(n), x(n))=|y(n)-x(n)|^2$, $\forall n$ (FIG. 12, step 330). Observe that due to subsampling by a factor of 2 the effective M is 16. In other words, by subsampling by a factor of 2 we gain in two ways: we reduce N by half, and, for a desired "effective" M for the N-long sequence we employ M/2 for the corresponding subsampled sequence. We have found out by experimentation that the loss in accuracy due to this subsampling by a factor of two is negligible, whereas the gain in speed is considerable. The particular choice of desired "effective" M has also been reached by experiment: it appears to provide excellent clustering, and an average of about five menu choices, consistent with our objectives. It is important to emphasize that the optimal choice of "effective" M depends on the individual preferences of the doctor, and on the imaging modality; what works best for CT scans may not be the best for X-rays. This latter factor is taken into account by the preferred embodiment of the invention. It is just as easy to account for individual doctor preferences.

Figure 7:
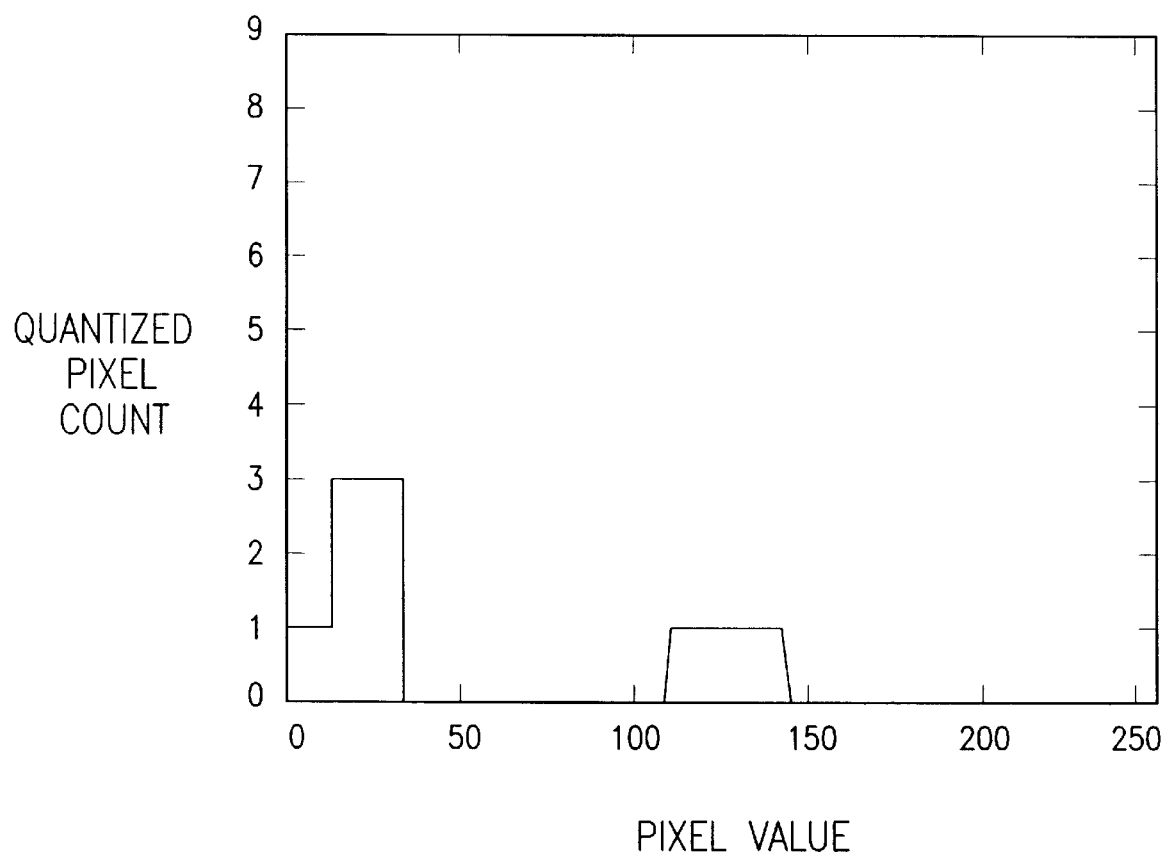
FIG. 7 is an optimal piecewise-constant runlength-constrained approximation (optimal approximation) of the coarsely quantized histogram of FIG. 6 in accordance with the invention.
Figure 8:
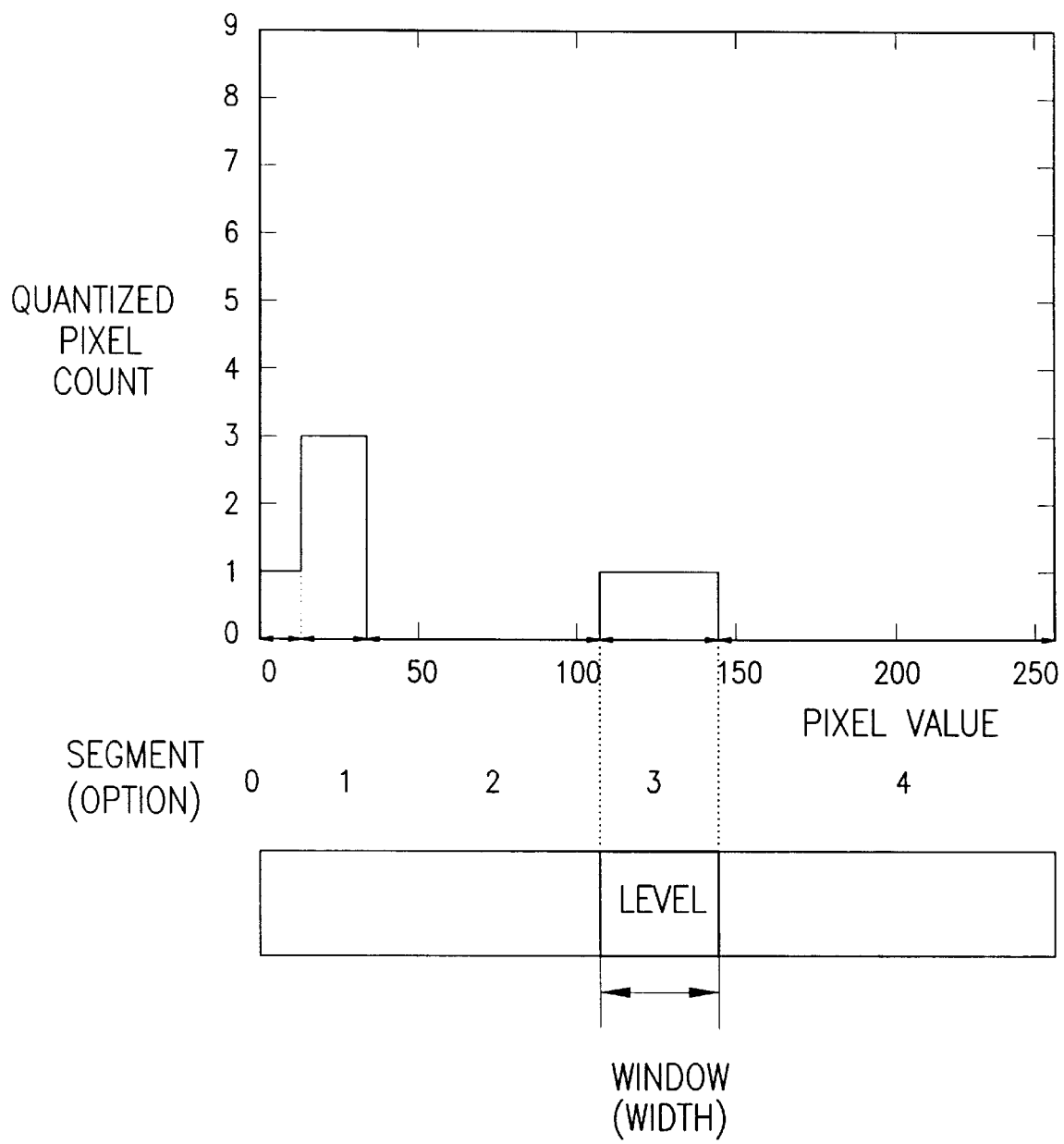
FIG. 8 is an illustration of the optimal approximation of FIG. 7 along with a suggested window and level setting option in accordance with the invention.

The resulting approximation (upsampled by a factor of 2) is depicted in FIG. 7, whereas the resulting segmentation, along with one suggested choice of window and level are presented in FIG. 8 (FIG. 12, steps 340, 350). Each individual segment (excluding endpoint segments) dictates a candidate window and level setting. In addition, unions of congruent segments are also considered, to allow for proper viewing of multimodal features. The first and the last of the suggested window and level choices are then discarded on the basis of prior knowledge (for example, in a CT image the first option is known to correspond to clinically irrelevant black background which occupies approximately 50% of the image) (FIG. 12, step 360).

Figure 9:
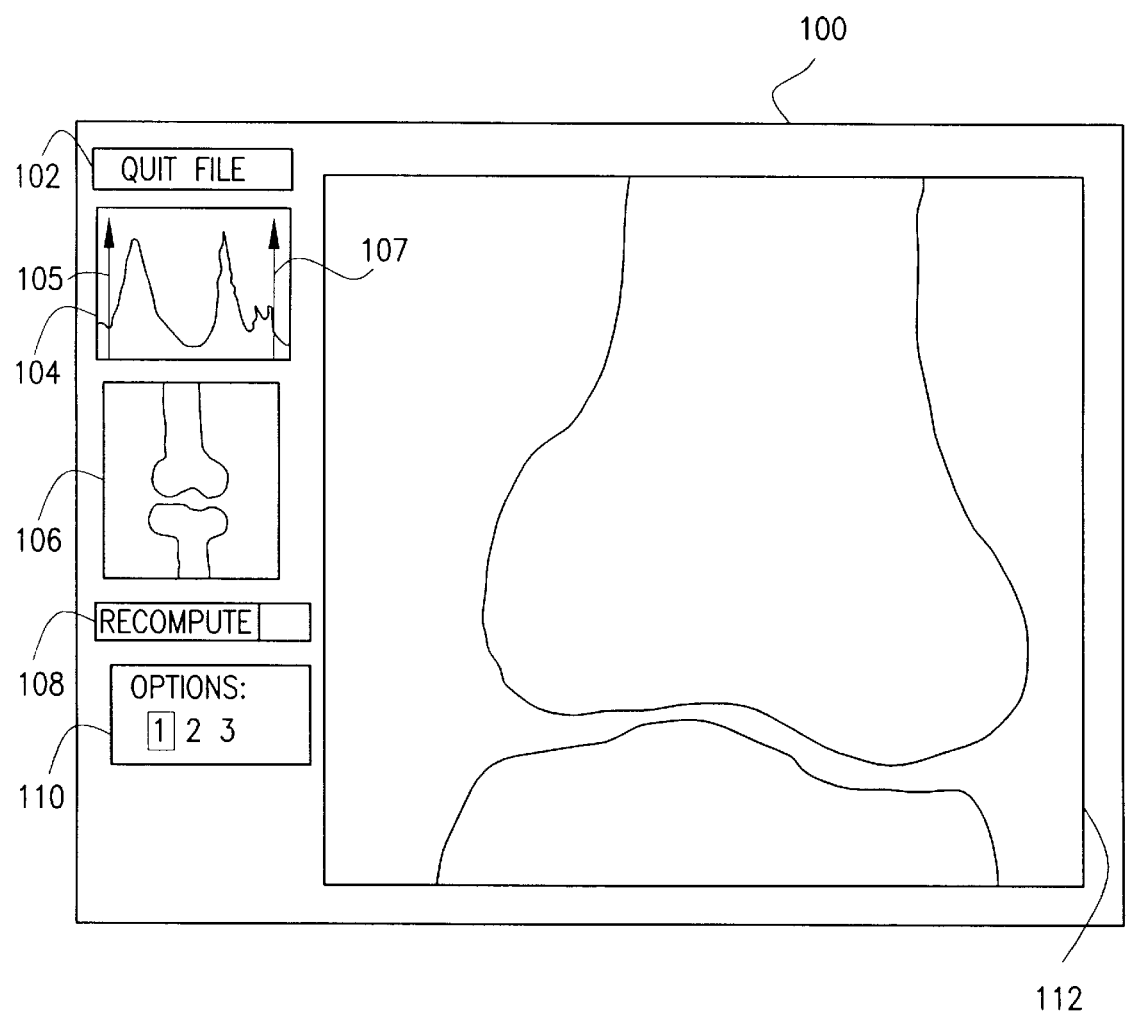
FIG. 9 is an illustration of the displayed output of the invention.

The results of employing the first window and level option is depicted in FIG. 9 (FIG. 12, step 370). FIG. 9 is an illustration of the final output 100 presented to the radiologist on display 24 (FIG. 1). The final output 100 includes program menu bar 102, a histogram output 104, an overview image output 106, a manual window and level calculation bar 108, a window and level option menu bar 110, and a detailed image output 112. The lines 105, 107 in the histogram output 104 reflect the window and level settings for this final output 100. As an example, FIG. 9 depicts a detailed image output 112 containing bone content. A radiologist concerned with other clinically relevant information would choose a different window and level option or setting from menu bar 110. Using the program menu bar 102, the resulting menu of choices depicted in window and level option menu bar 110, as generated in accordance with the invention, which may now be stored along with other image information, to facilitate viewing by others.

Figure 10:
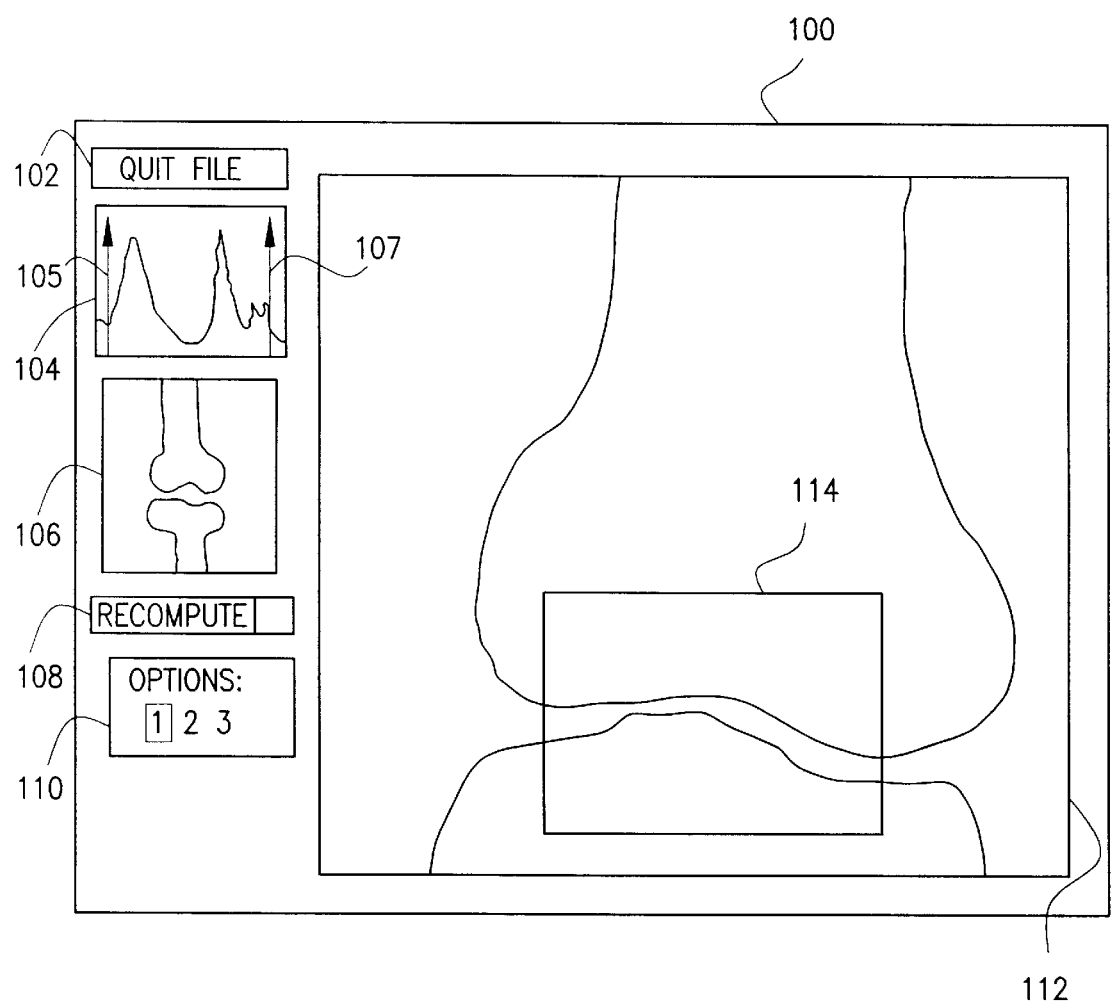
FIG. 10 is an illustration of the displayed output of FIG. 9 undergoing selective metering by the radiologist in accordance with the invention.

FIG. 10 is an illustration of another embodiment of the invention in which the radiologist zooms into a particular area of interest for better image enhancement. This will be referred to as "selective metering." Using the mouse 22, the keyboard 26, or any suitable data entry substitution for these devices, the radiologist can draw a box 114 around the area of interest. The histogram output 104 is updated and new window and level options are calculated in accordance with the invention, as described above.

Figure 11:
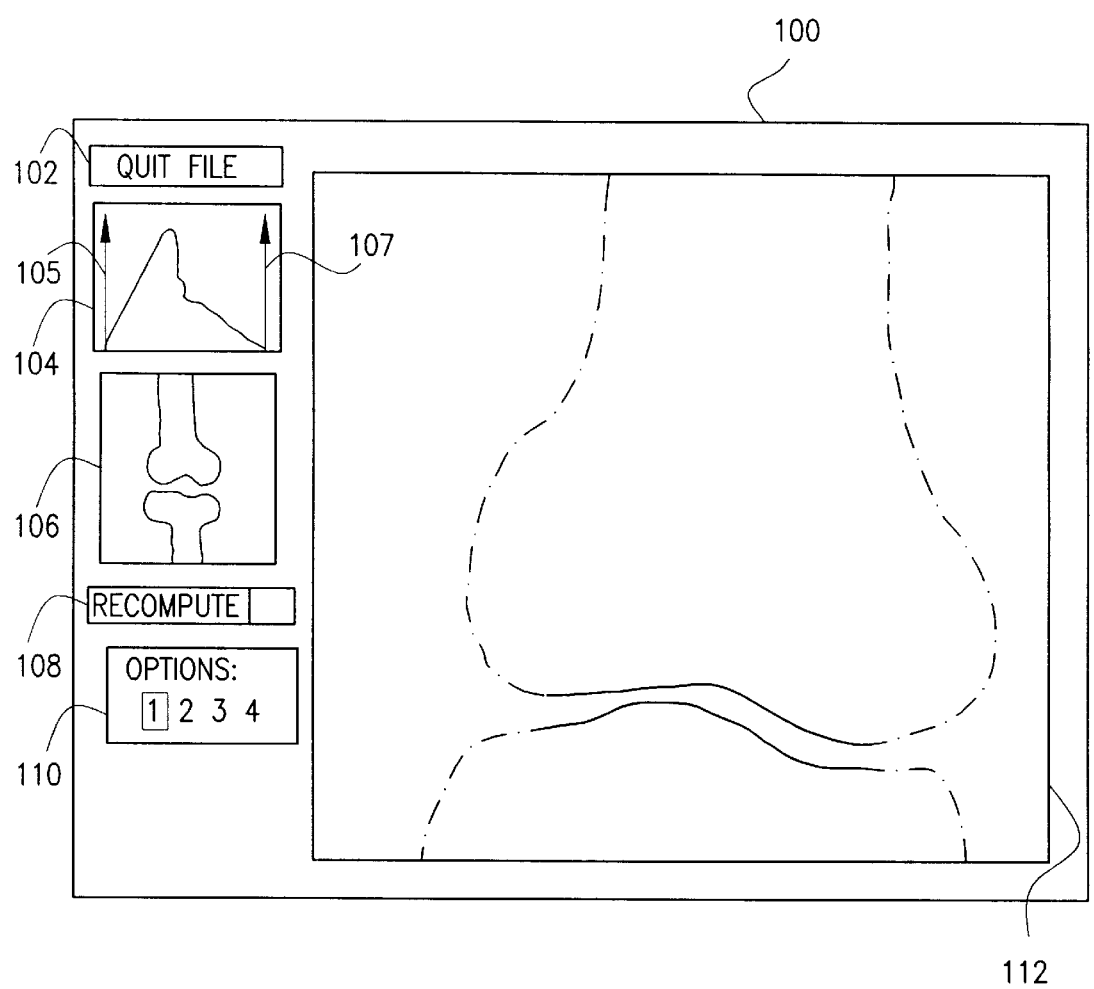
FIG. 11 is an illustration of the displayed output of the embodiment of FIG. 10 after selective metering has completed in accordance with the invention.

FIG. 11 depicts the selectively monitored image of FIG. 10. Of note are the changes to the histogram output 104, and the lines 105, 107 representing the window and level settings. The window and level options menu bar 110 contains new options for this selectively monitored image. In addition, the detailed image output 112 contains a much more detailed image of the selected area while the unselected area has become less visible.

The disclosed embodiments utilized a processor 20 to operate the window and level tool, it is appreciated that other embodiments, including commercially available Viterbi hardware may also be used.

Although the invention has been described in terms of the particular apparatus embodying the invention, the method steps required to make and use the apparatus are readily apparent to those of ordinary skill in the art merely from the description of the apparatus itself.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but are commensurate with the spirit and scope of the invention.

What is claimed is:

1. A method of displaying an image, said image having structures therein, said image being transformed into digital image data, the method comprising the steps of:

inputting said image data, said image data representing pixel values corresponding to the grey values of said image;

calculating a histogram of said image data, said histogram representing pixel values by the number of pixels with said pixel value in said image data;

segmenting the histogram using piecewise constant regression to obtain a plurality of magnitude constant segments, said segments being a statistical representation of a structure of said image; and displaying the image using at least one of said magnitude constant segments on a display terminal.

2. The method of claim 1, further comprising the step of processing the histogram using a nonlinear filter.

3. The method of claim 2, wherein said step of processing said histogram is optimized by a Viterbi optimization runlength-constrained approximation nonlinear filter.

4. The method of claim 2, further comprising the step of quantizing said histogram into a coarse representation of said histogram before segmenting said histogram into said segments.

5. The method of claim 2, further comprising the steps of:

displaying a window and level options menu, said menu listing a plurality of window and level options, each of the plurality of options corresponding to one of said segments;

selecting one of the window and level options; and displaying the image using said segment corresponding to said selected window and level option on said display terminal.

6. The method of claim 5, wherein the plurality of window and level options listed on said window and level options menu correspond to optimal segments.

7. The method of claim 5, further comprising the steps of:

selecting an area of said displayed segment;

calculating an aggregate intensity histogram of the selected area, said aggregate intensity histogram representing pixel values by the number of pixels with said pixel value in said selected area;

segmenting said aggregate intensity histogram using piecewise constant regression to obtain new magnitude constant segments, said new segments being a statistical representation of a structure of the selected area; and displaying one of said new segments on a display terminal.

8. The method of claim 5, further comprising the step of storing said segments.

9. A method of digital image processing, the method comprising the steps of:

obtaining a histogram profile of an image;

quantizing the histogram profile to produce a coarse representation of the histogram;

filtering the coarse representation of the histogram using an idempotent filter;

producing a subset of display parameters in response to said filtering step; and displaying the image on a display terminal using display parameters from the subset.

10. The method of claim 9, wherein said quantizing step further comprises the steps of:

detecting a maximum quantity in the histogram profile; and uniformly quantizing the histogram profile based on the maximum quantity detected.

11. The method of claim 9, wherein said quantizing step includes the step of hard limiting outliers to a maximum quantization level.

12. The method of claim 9, further comprising the step of subsampling the coarse representation of the histogram by a factor of two; and wherein the subset of display parameters is a menu of five choices of different window and level settings.

13. The method of claim 9, wherein the idempotent filter is a Viterbi-based nonlinear filter.

14. An apparatus for use in automatically displaying a medical diagnostic image, the apparatus comprising:

a display terminal; and a processor, wherein said processor calculates a histogram of the image, said processor segmenting said histogram using piecewise constant regression to obtain a plurality of segments representing structures of the image, said processor forwarding at least one of said segments to said display terminal to display a portion of the image.

15. The apparatus of claim 14, wherein said processor quantizes said histogram into a coarse representation of said histogram before segmenting said histogram into segments, and wherein said display terminal displays the medical diagnostic image using a union of segments.

16. The apparatus of claim 14, wherein said processor segments said histogram by a Viterbi optimization runlength-constrained approximation nonlinear filter.

17. The apparatus of claim 16, wherein said processor displays a window and level options menu, said menu listing a plurality of options, each of said options corresponding to one of said segments, said apparatus further comprising:

an input device connected to said processor, said input device for selecting one of said window and level options; and said processor responsive to said input device, said processor displaying the segment corresponding to said selected window and level option on said display terminal.

18. The apparatus of claim 17, wherein said plurality of options listed on said window and level options menu correspond to optimal segments; and wherein said display terminal is a Picture Archiving and Communications System (PACS) terminal.

19. The apparatus of claim 17, wherein said input device is adapted to select a region of interest, and said processor calculates a histogram of said selected area, said histogram representing pixel values by the number of pixels with said pixel value in said selected area, said processor segments said histogram using piecewise constant regression to obtain new segments, said new segments statistically representing a structure of said selected area, said processor displays one of said new segments on a display terminal.

20. An image station, comprising:

an image scanner, said image scanner transforming an image into digital image data;

an image server connected to said image scanner, said image server storing said image data;

an input device;

a processor, coupled to said input device and said image server, calculating a histogram of image data from said image server, said processor having a Viterbi optimization runlength-constrained approximation nonlinear filter segmenting the histogram into a collection of magnitude constant segments, wherein said segments statistically represent a structure of said image; and a display terminal, coupled to said processor, displaying the image using one of said constant segments.

21. The image station of claim 20, wherein said processor outputs image data to said display terminal for displaying the image using a window/level combination corresponding to one of the segments.

* * * * *